United States Patent
Ito et al.

(10) Patent No.: US 6,453,117 B1
(45) Date of Patent: Sep. 17, 2002

(54) IMAGING SYSTEM

(75) Inventors: Norikazu Ito; Satoshi Yoneya; Masakazu Yoshimoto; Satoshi Katsuo; Jun Yoshikawa; Shoji Nakamura; Tomohisa Shiga; Masaki Hirose; Hiroyuki Fujita; Kazutaka Iinuma; Syuichi Takazawa; Akira Yamaguchi, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/358,530

(22) Filed: Jul. 22, 1999

(30) Foreign Application Priority Data

Jul. 24, 1998 (JP) .............................. 10-209653

(51) Int. Cl.[7] .................................. H04N 5/91
(52) U.S. Cl. ........................... 386/70; 386/117; 348/231
(58) Field of Search ...................... 386/6–8, 38, 68–70, 386/80–82, 117, 45, 125–126; 358/906, 909.1; 348/559, 579, 231, 232, 233

(56) References Cited

U.S. PATENT DOCUMENTS

| | | | |
|---|---|---|---|
| 4,339,775 A | | 7/1982 | Lemke et al. |
| 4,614,980 A | | 9/1986 | Ninomiya et al. |
| 4,775,900 A | | 10/1988 | Blessinger |
| 5,239,418 A | * | 8/1993 | Tyler et al. .................... 386/81 |
| 5,355,450 A | * | 10/1994 | Garmon et al. ............. 348/578 |
| 5,548,340 A | * | 8/1996 | Bertram ....................... 348/559 |
| 5,621,473 A | * | 4/1997 | Hill ............................. 348/559 |

* cited by examiner

Primary Examiner—Thai Tran
Assistant Examiner—Christopher Onuaku
(74) Attorney, Agent, or Firm—Frommer Lawrence & Haug LLP; William S. Frommer

(57) ABSTRACT

An image from a camera is to be recorded and reversion is to be made to an image of an optional scene to reproduce an image of such scene. To this end, a CPU 20 converts image signals at a rate of 90 frames per second from a camera device 10 into parallel signals to output image signals of the usual rate of 30 frames per second. A video server 30 records the image signals from the CCU 20 on a RAID 32. If a pre-set scene is to be reproduced, the image signals are read out from the RAID 32 in the order of the original image signals to output the read-out image signals to outside.

14 Claims, 5 Drawing Sheets

| A0 | B0 | C0 | A1 | B1 | C1 | A2 | B2 | C2 | A3 | B3 | C3 |

| A0 | B0 | C0 | A1 |

FIG.2

IMAGING SYSTEM

BACKGROUND OF THE INVENTION

1. Field of the Invention

This invention relates to an imaging system in which, a desired scene of image signals as shot is reproduced at the same time as the image signals are recorded.

1. Description of the Related Art

The images aired in, for example, a news program by a telecasting station, are those obtained on editing the image and the speech recorded on plural television cameras having enclosed video tape recorders. The images etc edited in this manner are recorded on a video tape and reproduced in the course of telecasting.

On the other hand, if the telecasting station makes live relay broadcasting of a sports game, plural cameras are used simultaneously and selectively depending on the progress of the game to send the images and the speech to respective homes, while the images etc are recorded on a video tape recorder.

If, in the course of the live relay telecasting of sports games, a sports player has made fine play, the scene is sometimes re-played at a slow speed or at an ordinary speed in order to re-transmit the scene to the viewers.

In particular, there are such cameras used for relay broadcast of sports games which are adapted to output image signals at a speed thrice the usual speed, for example, in order to make slow-motion reproduction of an object moving at an elevated speed with a high picture quality. For coping with this, the video tape recorder is designed to be run at a speed thrice the usual speed to record the video signals transmitted from the camera. For slow reproduction, the tape recorder runs the magnetic head at the usual speed to reproduce the video signals. This assures slow reproduction with a smooth movement and a high picture quality.

However, since the video tape recorder usually has only one recording head, it is not possible to reproduce previously recorded images and simultaneously to record images or speech. On the other hand, if desired to record images shot by a camera and simultaneous reproduce an optional scene, it is necessary to record the images simultaneously on plural video tape recorders, to use one of the video tape recorders as a video tape recorder dedicated to recording, and to use the remaining video tape recorders for replay. This means that it is a highly pains-taking operation to record images and to reproduce optional scenes simultaneously.

SUMMARY OF THE INVENTION

It is therefore an object of the present invention to provide an imaging system in which it is possible to record images from a camera and to revert to an optional scene to reproduce an image corresponding to the scene.

In one aspect, the present invention provides an imaging system including imaging means for outputting image signals shot of an object, speed changing means for changing the image signals outputted by the imaging means at a first speed into signals of a second speed to output the image signals of the second speed and recording/reproducing means. The recording/reproducing means includes a plurality of input/output processing means to which are inputted the signals of the second speed outputted by the speed changing means and which output the reproduced image signals to outside, and a non-linear accessible recording medium for recording the image signals. The recording/reproducing means has access to the recording medium only within an allocated time slot to output the image signals inputted from the speed changing means to the recording medium. The recording/reproducing means has access to the recording medium only within the allocated time slot to input the reproduced image signals from the recording medium.

In another aspect, the present invention provides a recording/reproducing method for recording/reproducing as-shot image signals including a first step of outputting image signals as shot by imaging means at a first speed, a second step of converting the image signals at the first speed, outputted at the first step, into those at a second speed, and for outputting the converted image signals, a third step of inputting the image signals outputted at the second step and outputting the input image signals to a non-linear accessible recording medium only within an allocated time slot, a fourth step of recording the image signals outputted at the third step on the recording medium, a fifth step of reproducing the image signals recorded at the fourth step on the recording medium and a sixth step of outputting the image signals reproduced at the fifth step only within the allocated time slot to outside at the second speed in the order of the image signals of the first speed.

In yet another aspect, the present invention provides a recording method for recording as-shot image signals including a first step of outputting image signals as shot by imaging means at a first speed, a second step of converting the image signals at the first speed, outputted at the first step, into those at a second speed, and for outputting the converted image signals, a third step of outputting the input image signals to a non-linear accessible recording medium only within an allocated time slot; and a fourth step of recording the image signals outputted at the third step on the recording medium.

According to the present invention, image signals from imaging means can be recorded on recording means, while reversion may be made to an optional scene to read out and reproduce picture signals of the scene.

According to the present invention, image signals of large capacity can be compressed and recorded in this state on a server, while reversion may be made to an optional scene to read out and reproduce picture signals of the scene.

BRIEF DESCRIPTION OF THE DRAWINGS

FIG. 2 illustrates the flow of CCU image signals of the camera system.

DESCRIPTION OF THE PREFERRED EMBODIMENTS

Figure 1:
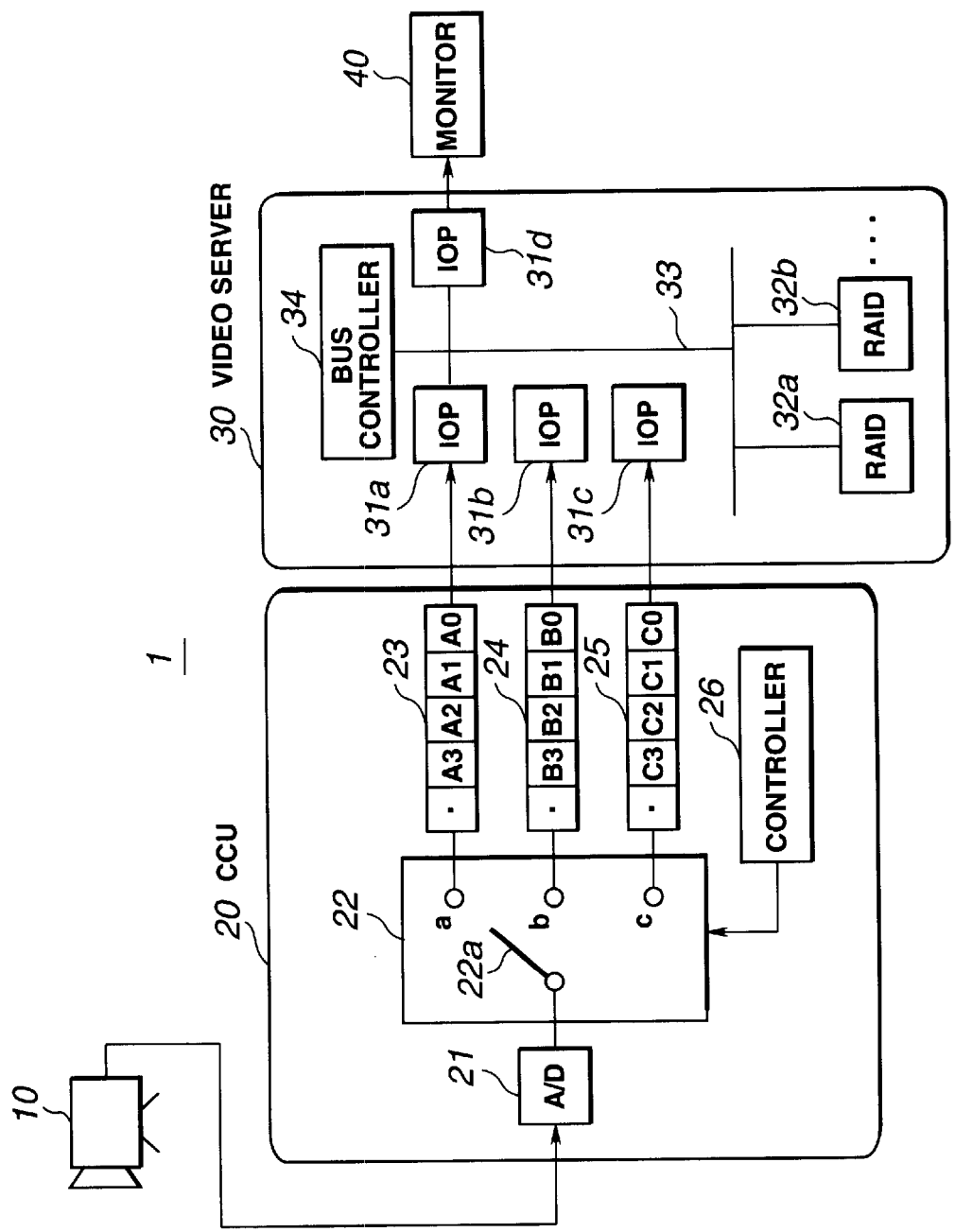
FIG. 1 is a block diagram showing the structure of a camera system embodying the present invention.

Referring to the drawings, preferred embodiments of the present invention will be explained in detail.

The present invention is applied to a camera system 1 configured as shown for example in FIG. 1.

The camera system 1 includes a camera device 10 for shooting an object, a camera control unit (CCU) 20 for processing image signals from the camera device 10 in a pre-set fashion, and a video server 30 for storing the image signals from the CCU 20.

The camera device 10 is a high-speed camera and outputs image signals at a speed thrice the usual speed (90 frames per second) to furnish the output image signals to the CCU 20.

The camera device 10 generates three color signals, responsive to the imaging light of the object, and converts the tri-color signals into luminance and chrorminance signals which are outputted as image signals. It is noted that the processing as from the CCU 20 is the same for the luminance and chromninance signals. Thus, in FIG. 1, only a signal line routing one of the luminance or the chrominance signals from the camera device 10 to the CCU 20 is shown, while other signal lines are not shown.

The CCU 20 performs pre-set signal processing, such as gamma correction or knee processing, on image signals form the camera device 10, and also has the rate converting function. For performing these functions, the CCU 20 includes an analog/digital (A/D) converter 21 for digitizing image signals, a data distributor 22 for outputting image signals from the A/D converter 21 via pre-set terminal, and a first memory 23, a second memory 14 and a third memory 25 for storing the distributed image signals. The CCU20 also includes a controller 26 for controlling the switching by the data distributor 22.

The A/D converter 21 digitizes the image signals, processed in a pre-set fashion, and routes the image signals to the data distributor 22.

The data distributor 22 includes a switch 22a for selecting one of the terminals a, b or c. The picture signals supplied from the A/D converter 21 are outputted via terminals a, b or c. The controller 26 performs control to move a movable terminal of the switch 22a to the terminals a, b, c, a, b, c, . . . every 1/90 second. This connects the switch 22a to the terminals a, b and c every 1/30 period.

Figure 2:
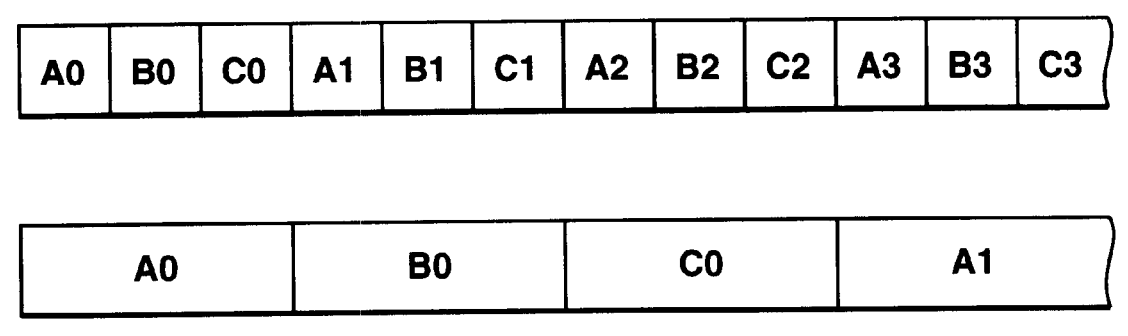

FIG. 2 shows an example of image signals outputted by the A/D converter 21. Referring to FIG. 2, the image signals are fed to the data distributor 22 in the order of A0, B0, C0, A1, B1, C1, A2, B2, C2, . . . , where An, Bn and Cn, n being an integer not less than 0, denote image signals for one frame outputted during 1/90 second.

The first memory 23, the second memory 24 and the third memory 25 are each comprised of a shift register. The data distributor 22 writes the image signals A0, B0, C0, A1, . . . in the first memory 23, second memory 24, third memory 24 and in the first memory 23, . . . , respectively. Stated differently, the data distributor 22 writes the image signals A0, A1, A2, A3, . . . in the first memory 23, while writing the image signals B0, B1, B2, B3, . . . in the second memory 25 and writing the image signals C0, C1, C2, C3, . . . in the third memory 25 every 1/30 second. The result is that image signals are read out at a rate of 30 frames per second.

The CCU 20 processes the image signals, supplied from the camera device 10 at a rate thrice the usual rate, in a pre-set fashion, and distributes the image signals into three signal portions every 1/90 second by way of conversion to parallel signals. The image signals, thus converted into signals of the usual rate of 30 frames per second, are routed to the video server 30.

Figure 3:
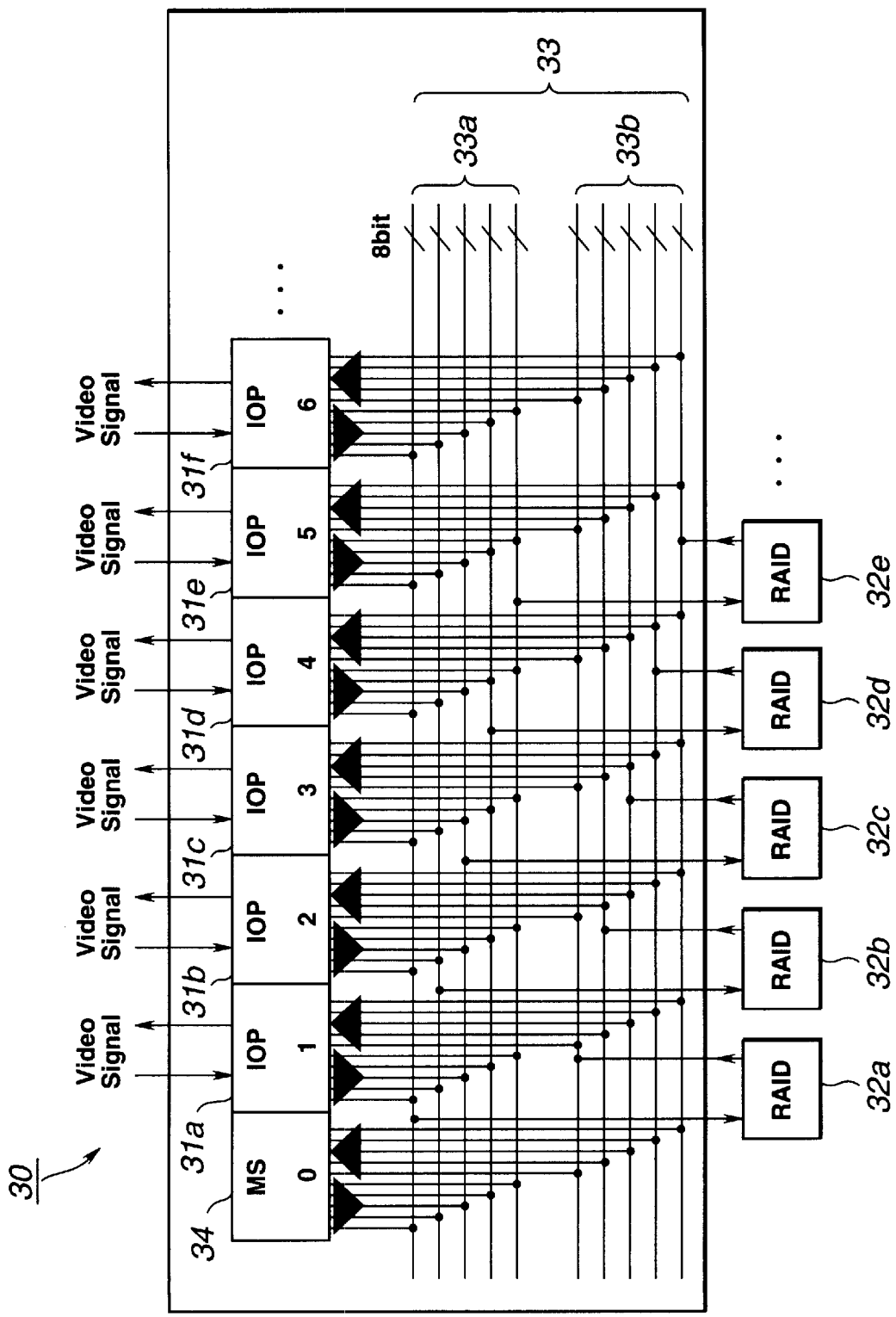
FIG. 3 is a block diagram showing the structure of a video server of the camera system.

Specifically, the video server 30 is configured as shown in FIG. 3. That is, the video server 30 is made up of an input/output processing unit 31 (31a to 31f), a RAID (Redundant Array of Inexpensive Discs) 32 (32a to 32e) and an MS 34.

The input/output processing unit 31 compresses the image signals supplied from outside to route the compressed image signals to the RAID 32 over an input data bus 33a. The image memory 32 also expands the image signals read out from the RAID 32 to output the expanded image signals over an output data bus 33b.

The RAID 32 is made up of plural hard disc drives (HDDs) such that it is able to record data by a certain magnetic head at the same time as it seeks another magnetic head to reproduce optional data. Meanwhile, the video server 30 shown in FIG. 1 shows the video server 30 of FIG. 3 in a simplified fashion.

Returning to FIG. 1, the video server 30 includes plural input/output processing units 31 (31a, 31b, 31c, 31d, ), plural RAIDs 32 (32a, 32b, ) and a bus controller 34.

The bus controller 34 controls time slots on the bus 33 provided in association with the numbers of the input/output processing units 31 and the RAIDs 32 to effect the recording/reproduction by the input/output processing unit 31 and by the RAID 32 simultaneously.

The input/output processing unit 31a compresses image signals read out from the first memory 23, while the input/output processing unit 31b and the input/output processing unit 31c compress the image signals read out from the second memory 24 and from the third memory 25, respectively. These input/output processing units 31 send the compressed image signals over the bus 33 to the RAIDs 32a and 32b.

That is, the image signals distributed into three signal portions in the CPU 20 and converted to usual rate signals are respectively recorded in the RAIDs 32 of the video server 30.

For reproducing an optional scene, the video server 30 reads out the image signals recorded on the RAID 32 in the order of the original video frames to output the read-out signals via the input/output processing unit 31d. That is, the video server 30 reads out the image signals A0, B0, C0, A11, B11, C11, A2, B2, C2, at the usual video rate and outputs the read-out signals after expansion by the input/output processing unit 31d.

During recording, the video server 30 randomly stores the image signals, converted from the rate of 90 frames per second to 30 frames per second. During slow reproduction, the video server 30 reads out the image signals at a rate of 30 frames per second in the order of the original image signals by way of conversion to parallel signals. That is, the video server 30 outputs image signals for slow reproduction of smooth movement via input/output processing unit 31d rather than outputting image signals of discretely located frames. An image of slow reproduction, obtained in this manner, is displayed on the monitor 40.

Meanwhile, such slow reproduction can be preformed at the same time as the image signals are inputted from the input/output processing units 31a to 31c for recording on the RAID 32a. That is, it is possible to record image signals of, for example, live sports relay broadcasting and simultaneously to seek a scene desired to be slow-reproduced and to slow-reproduce the scene.

In the preferred embodiment, the camera device 10 outputs the image signals at a rate thrice the usual rate. The present invention is, however, not limited to this configuration. That is, if the camera device 10 outputs image signals at a n-tupled rate, where n is a natural number, it suffices if the CCU 20 distributes the image signals into n signal portions to convert the image signals into image signals of the usual rate to output the resulting image signals of the usual rate. At this time, it suffices if the video server 30 stores the image signals in the RAID 32 and reads out the image signals from the RAID 32 for reproduction in the sequence of the original image signals. This assures slow motion reproduction at the 1/n speed.

Figure 4:
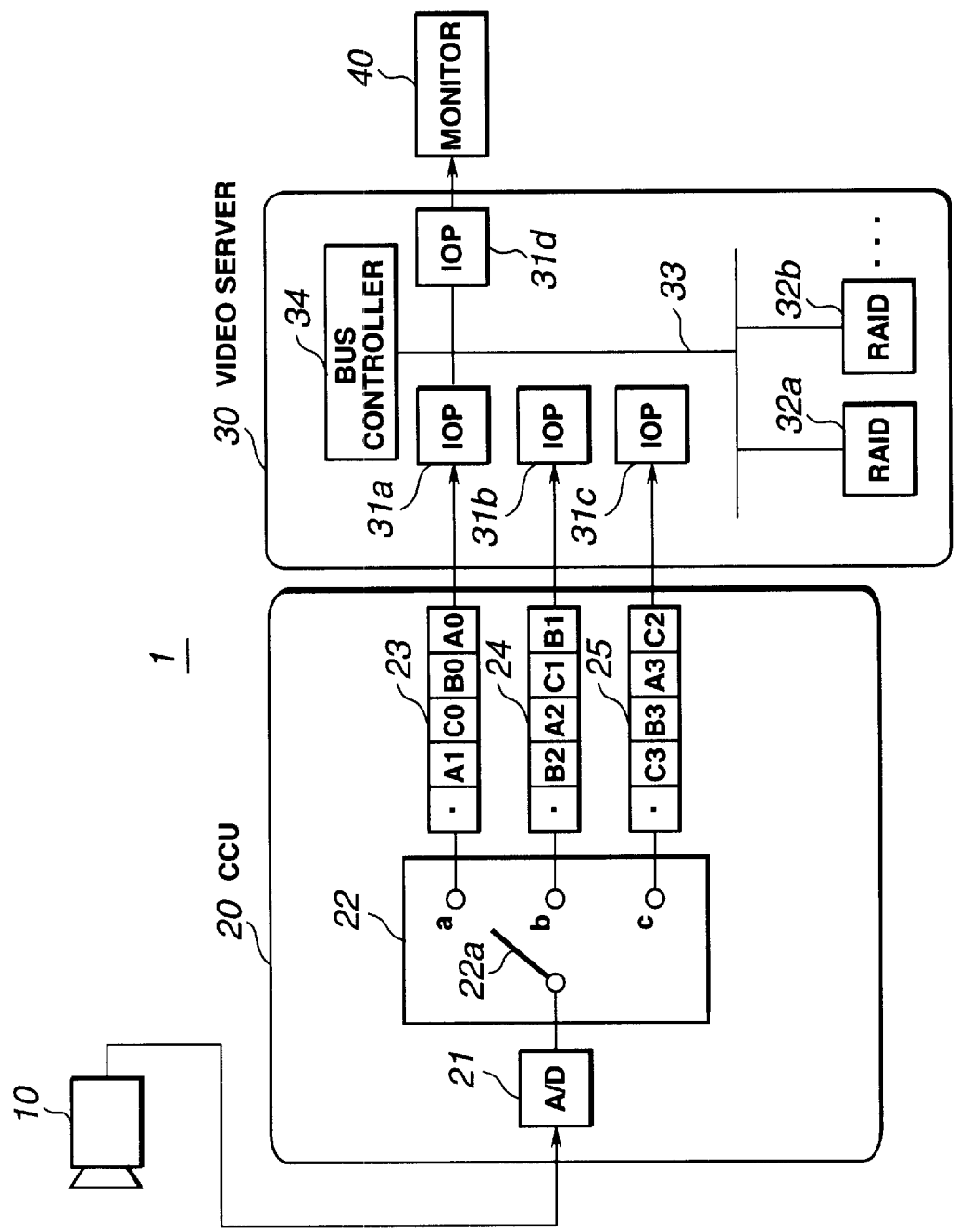
FIG. 4 is a block diagram showing the structure of another camera system embodying the present invention.

A second embodiment of the present invention is explained with reference to FIG. 4 in which the camera system 1 is similar in structure to that of the first embodiment.

In the first embodiment, the video server 30 randomly records the image signals in the RAID 32 on the frame basis. This renders it necessary for the video server 30 to have random access to the recording area of the RAID 32 at the time of reproduction. However, certain types of the HDD constituting the RAID 32 cannot read data unless the data are continuous to some extent. The preferred embodiment is designed to cope with this type of the HDD.

Specifically, the controller 26 of the CCU 20 changes over the state of the switch 22a every four frames of the video signals routed from the camera device 10 to the CCU 20. This causes the image signals A0, B0, C0, A1 to be collectively stored in the first memory 23, while causing the image signals B1, C1, A2, B2 to be collectively stored in the second memory 24 and causing the image signals C2, A3, B3, C3 to be collectively stored in the third memory 25. The image signals A4, B4, C4 and A5 then are stored in the first memory 23. These four frames of the image signals are collectively stored in this manner in the RAID 32.

During reproduction, it is sufficient if the video server 30 reads out the image signals from the RAID 32 in terms of the four frames as a unit. That is, since the video server 30 stores the image signals in terms of a pre-set sizeable volume as a unit, the magnetic head seek time can be shorter at the time of reproduction than if the image signals are randomly stored on the frame basis. This renders it possible to cope with the RAID 32 comprised of HDDs that cannot read out data unless the data is continuous to some extent.

In the preferred embodiment, description has been made of an instance of storing image signals of four frames as a unit volume in the RAID 32. The present invention, however, is naturally not limited to this configuration. Specifically, it is sufficient if the unit volume corresponds to the continuous data volume that can be read out by the HDDs constituting the RAID 32, such that the number of frames is not fixed at a special number of frames, such as five or six frames.

Figure 5:
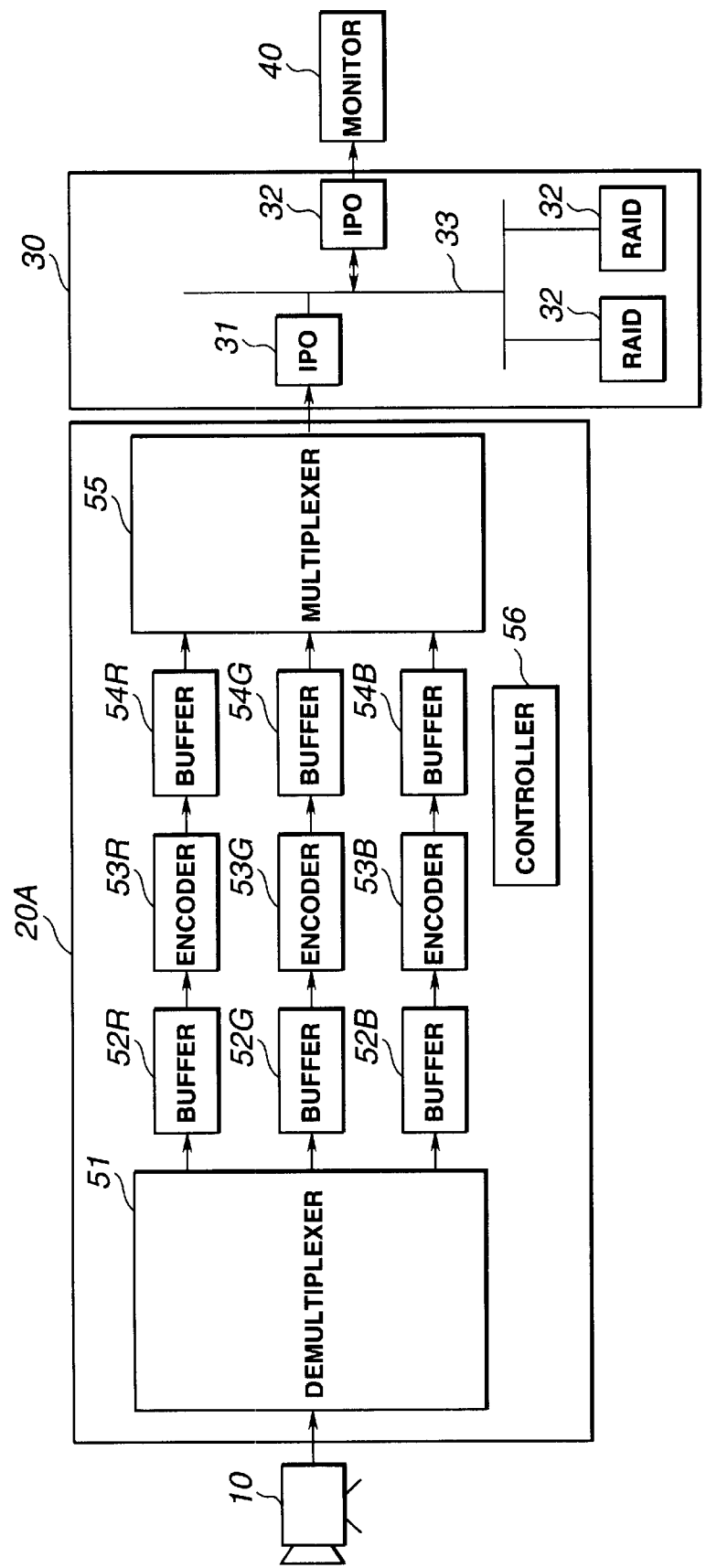
FIG. 5 is a block diagram showing the structure of yet another camera system embodying the present invention.

A third embodiment of the present invention is explained with reference to FIG. 5. In the present third embodiment, the same reference numerals are used to depict the same circuits and detailed description is omitted for simplicity.

The camera device 10 generates image signals, comprised of three prime color signals, responsive to the imaging light from an object, and routes these image signals to a CCU 20A. The camera device 10 is a camera for high-speed imaging adapted for outputting image signals at a rate of 90 frames per second, as in the first embodiment.

The CCU 20A includes a demultiplexer 51 for demultiplexing the image signals, a buffer memory 52 (52R, 52G and 52B), an encoder 53 (53R, 53G and 52B) for compressing respective color signals, a buffer memory (54R, 54G and 54B) for outputting compressed color signals from the encoder 53 at a pre-set rate, a multiplexer 55 (55R, 55G, 55B) for multiplexing the respective compressed color signals, and a controller 56 for controlling the respective circuits of the CCU 20A.

The demultiplexer 51 demultiplexes the image signals supplied from the camera device 10 into red, green and blue signals, which then are routed to the buffer memories 52R, 52G and 52B, respectively. The image signals, inputted to the CCU 20A at a rate thrice the usual rate, are converted in this manner into signals of the usual rate which are routed to the respective encoders 53R, 53G and 53B.

The encoders 53 53R, 53G and 53B are able to process the image signals of the usual input rate (30 frames per second) to compress the data volume of the respective color signals to, for example, one third. Specifically, if red signals are sent to the buffer memory 52R, the encoder 53R compresses the red signals and routes the compressed signals via the buffer memory 54R to the multiplexer 55. Similarly, the encoder 53G compresses the data of green signals stored in the buffer memory 52G to route the compressed data to the multiplexer 55 via buffer memory 54G. The encoder 53B compresses the green signals stored in the buffer memory 52B to route the compressed data via the buffer memory 54B to the multiplexer 55.

The multiplexer 55 multiplexes the compressed respective color signals to output compressed image signals. The data volume of the respective color signals is one/third. Therefore, the image signals outputted by the multiplexer 55 are reduced in data volume to one-third of the image signals sent from the camera device 10 to the CCU 20A and becomes equal in volume to the usual data volume. These image signals are routed to the video server 30.

It is thus possible for the camera system 1 to compress the data of the respective color signals making up the image signals from one color signal type to another to reduce the data volume of the image signals in their entirety to supply the image signals of the large data volume outputted by the camera device 10 to the video server 30 without limiting the cable transfer rate.

Meanwhile, the above-described camera system 1 can also be applied to the outputting of image signals of the usual rate by the camera device 10. Specifically, the controller 56 in the CCU 20A is able to send the image signals supplied to the demultiplexer 51 only to the encoder 53R via the buffer memory 52R to cause only the encoder 53R to compress the data volume. This enables the data volume of the image signals to be reduced to one-third, while also enabling suppression of power consumption by halting the processing by the encoders 53G, 53B.

In the preferred embodiment, as in the previously described embodiments, an image of an optional scene can be reproduced at the same time as the image signals as shot by the camera device 10 are being recorded in the video server 30.

Although the present invention has been explained in the above embodiments with respect to plural HDDs as non-linear accessible recording mediums, it is to be noted that the present invention is also applicable to other non-linear accessible recording mediums, including disc-shaped recording mediums, such as DVDs or MO (magnetic optical) discs, or semiconductor memories, such as DRAMs or flash memories.

What is claimed is:

1. An imaging system comprising:
   imaging means for outputting image signals shot of an object;
   speed changing means for changing said image signals outputted by said imaging means at a first speed into signals of a second speed to output the image signals of the second speed; and
   recording/reproducing means; said recording/reproducing means including
      a plurality of input/output processing means to which are inputted said signals of the second speed outputted by said speed changing means and which output the reproduced image signals to outside; and a non-linear accessible recording medium for recording the image signals;

said recording/reproducing means having access to said recording medium only within an allocated time slot to output the image signals inputted from said speed changing means to said recording medium; said recording/reproducing means having access to said recording medium only within said allocated time slot to input said reproduced image signals from said recording medium.

2. The imaging system according to claim 1 wherein said speed changing means includes changeover means fed with the image signals of the first speed from said imaging means and adapted for changing over the image signals of the first speed every pre-set unit of said image signals; and a plurality of memory means for transiently storing said image signals outputted by said changeover means, said changeover means changing over the image signals at said first speed in a distributing fashion to said plural in memory means, each of said memory means reading out the transiently stored image signals at said second speed to output the read-out image signals to the input/output processing means of said recording/reproducing means.

3. The imaging system according to claim 2 wherein said changeover means changes over the image signals so that said image signals will be outputted to each of said memory means at said second speed.

4. The imaging system according to claim 2 wherein if said first speed is a n-tupled speed, n being a natural number, the number of said plural memory means is n, said second speed being a uni-tupled speed.

5. The imaging system according to claim 1 wherein said input/output processing means includes compression means for compressing the input imaging signals.

6. The imaging system according to claim 1 wherein said input/output processing means outputs the image signals recorded on said non-linear accessible recording medium to outside at said second speed in the order of the image signals at said first speed.

7. The imaging system according to claim 1 wherein each of said plural input/output processing means is connected over a data bus to said non-linear accessible recording medium, and wherein said data bus is constituted by a down-bus to said recording medium and an up-bus from said recording medium, said image signals being sent on said data bus.

8. The imaging system according to claim 1 wherein said non-linear accessible recording medium is a plurality of hard discs.

9. A recording/reproducing method for recording/reproducing as-shot image signals comprising:

a first step of outputting image signals as shot by imaging means at a first speed;

a second step of converting the image signals at the first speed, outputted at said first step, into those at a second speed, and for outputting the converted image signals;

a third step of inputting said image signals outputted at said second step and outputting the input image signals to a non-linear accessible recording medium only within an allocated time slot;

a fourth step of recording the image signals outputted at said third step on said recording medium;

a fifth step of reproducing said image signals recorded at said fourth step on said recording medium; and a sixth step of outputting the image signals reproduced at said fifth step only within the allocated time slot to outside at said second speed in the order of the image signals of said first speed.

10. The recording/reproducing method for image signals according to claim 9 wherein said second step includes a change-over step of changing over the image signals inputted at said first speed every pre-set unit to a plurality of memory means adapted for transiently storing said linage signals; and an outputting step of reading out and outputting the image signals inputted to said storage means at said second speed.

11. The recording/reproducing method for image signals according to claim 10 wherein said changeover step changes over so that said image signals will be outputted at said second speed to each of said memory means.

12. The recording/reproducing method according to claim 9 wherein if said first speed is a n-tupled speed, n being a natural number, the number of said plural memory means is n, said second speed being a uni-tupled speed.

13. The recording/reproducing method according to claim 9 wherein said third step includes a compressing step of compressing the input image signals and outputting the compressed signals, said compressed image signals being outputted to said recording medium within the allocated time slot.

14. The recording/reproducing method according to claim 9 wherin said non-linear accessible recording medium is a plurality of hard discs.

* * * * *